(12) United States Patent
Matthews et al.

(10) Patent No.: US 9,724,789 B2
(45) Date of Patent: Aug. 8, 2017

(54) MOBILE WELDING SYSTEM

(71) Applicant: LINCOLN GLOBAL, INC., City of Industry, CA (US)

(72) Inventors: William T. Matthews, Chesterland, OH (US); Patrick S. Wahlen, Jupiter, FL (US); Stephen R. Cole, Chula Vista, CA (US); Bruce A. Schlee, Oregon, WI (US); Keith L. Schlee, Oregon, WI (US)

(73) Assignee: Lincoln Global, Inc., Santa Fe Springs, CA (US)

( * ) Notice: Subject to any disclaimer, the term of this patent is extended or adjusted under 35 U.S.C. 154(b) by 245 days.

(21) Appl. No.: 14/550,496

(22) Filed: Nov. 21, 2014

(65) Prior Publication Data

US 2015/0158129 A1     Jun. 11, 2015

Related U.S. Application Data

(60) Provisional application No. 61/912,934, filed on Dec. 6, 2013.

(51) Int. Cl.
    *B23K 9/12*            (2006.01)
    *B23K 9/00*            (2006.01)
    (Continued)

(52) U.S. Cl.
    CPC ...... *B23K 37/0294* (2013.01); *B23K 37/0211* (2013.01); *B23K 37/0217* (2013.01);
    (Continued)

(58) Field of Classification Search
    CPC ............ B23K 37/0294; B23K 37/0211; B23K 37/0217; B23K 37/0264; B23K 37/0282;
    (Continued)

(56) References Cited

U.S. PATENT DOCUMENTS 3,935,420 A    1/1976   Sandstrom
4,168,430 A    9/1979   Denis et al.
(Continued)

FOREIGN PATENT DOCUMENTS

CA      2358279 A1    4/2003
CN      1152489       6/1997
(Continued)

OTHER PUBLICATIONS

International Preliminary Report on Patentability issued on PCT/IB2014/002672, mailed Jun. 7, 2016.
(Continued)

*Primary Examiner* — Reginald L Alexander
(74) *Attorney, Agent, or Firm* — Foley & Lardner LLP

(57) ABSTRACT

A mobile welding system that does not rely exclusively on a track to define the path of the welder. The present invention generally provides a mobile welder adapted to move along a work piece, the mobile welder including a chassis supporting a motor assembly; a travel assembly attached to the chassis and adapted to support the chassis over a portion of the work piece, wherein the motor is coupled to the travel assembly to selectively cause the chassis to move relative to the work piece; a controller connected to the motor assembly to control movement of the chassis relative to the work piece; a chassis holder connected to the chassis, the chassis holder being adapted to provide a force holding the chassis a selected distance from the work piece; and a welder supported on the chassis, the welder including an implement adapted to perform a welding operation, wherein the implement is supported on the chassis at a location where the implement and the chassis define an uninterrupted line of sight from the implement to the work piece, wherein the chassis holder is spaced from the line of sight a distance
(Continued)

sufficient to prevent the chassis holder from interfering with the welding operation.

20 Claims, 8 Drawing Sheets

(51) Int. Cl.
*B23K 37/02* (2006.01)
*B60B 19/00* (2006.01)
*B23K 9/32* (2006.01)

(52) U.S. Cl.
CPC ...... *B23K 37/0264* (2013.01); *B23K 37/0282* (2013.01); *B60B 19/003* (2013.01); *B23K 9/32* (2013.01); *B23K 37/02* (2013.01); *B60B 2900/551* (2013.01); *B60Y 2200/60* (2013.01); *B60Y 2200/80* (2013.01)

(58) Field of Classification Search
CPC .......... B23K 37/02; B23K 9/282; B23K 9/32; B23K 9/295; B23K 9/1006; B23K 33/004; B60Y 2200/80; B60Y 2200/60; B60B 19/003; B60B 2900/551; H01F 7/0252; H01F 7/0257; H01F 7/0268; H01F 7/206; H01F 2007/208; B25B 11/002; A47G 1/17; A47K 5/05; F16B 47/00
USPC ........... 219/138, 124.31, 136, 137.31, 130.1, 219/137 R; 248/206.5, 309.4, 683; 269/8
See application file for complete search history.

(56) References Cited

U.S. PATENT DOCUMENTS

| | | | |
|---|---|---|---|
| 4,412,401 A | 11/1983 | Fundell | |
| 4,744,855 A | 5/1988 | Ellenberger et al. | |
| 4,831,232 A | 5/1989 | Andersson et al. | |
| 4,888,708 A * | 12/1989 | Brantmark | G05B 19/427 700/264 |
| 6,627,004 B1 * | 9/2003 | Lockhart | B23K 7/10 148/196 |
| 6,917,013 B2 * | 7/2005 | Kondo | B23K 9/02 219/124.31 |
| 6,952,909 B2 | 10/2005 | Rossi et al. | |
| 7,745,757 B2 * | 6/2010 | Enyedy | B23K 37/0294 219/124.31 |
| 7,775,752 B2 | 8/2010 | Karow | |
| 2003/0173130 A1 | 9/2003 | Johns | |
| 2008/0087484 A1 * | 4/2008 | Fenelli | B60B 19/003 180/236 |
| 2008/0203075 A1 * | 8/2008 | Feldhausen | B23K 9/013 219/136 |
| 2009/0020970 A1 * | 1/2009 | Klein | B23K 37/0282 280/47.35 |
| 2009/0314756 A1 * | 12/2009 | Schaeffer | B23K 9/186 219/137 R |
| 2010/0051596 A1 * | 3/2010 | Diedrick | B23K 9/1336 219/137.2 |
| 2010/0176106 A1 * | 7/2010 | Christensen | B23K 37/0264 219/137 R |
| 2010/0314373 A1 * | 12/2010 | Patterson | B65H 51/14 219/136 |
| 2011/0095009 A1 * | 4/2011 | Kindig | B23K 9/10 219/130.1 |
| 2011/0210110 A1 * | 9/2011 | Dearman | B23K 9/0206 219/137 R |
| 2012/0080417 A1 * | 4/2012 | Oberzaucher | B23K 9/32 219/136 |
| 2013/0119033 A1 * | 5/2013 | Lipnevicius | B23K 37/02 219/130.1 |
| 2013/0292918 A1 | 11/2013 | Schlee et al. | |

FOREIGN PATENT DOCUMENTS

| | | |
|---|---|---|
| CN | 202655806 U | 1/2013 |
| CN | 102991578 A | 3/2013 |
| CN | 103009917 A | 4/2013 |
| EP | 0468845 A1 | 1/1992 |
| EP | 0 897 775 | 10/2000 |
| GB | 790511 A | 2/1958 |
| JP | H04237566 A | 8/1992 |
| JP | H07185812 A | 7/1995 |
| KR | 20080054705 A | 6/2008 |
| KR | 100902142 B1 | 6/2009 |
| KR | 20090061746 A | 6/2009 |
| KR | 20090073595 A | 7/2009 |
| KR | 20100035501 A | 4/2010 |
| KR | 101 078 233 B1 | 11/2011 |
| KR | 20110118878 A | 11/2011 |
| KR | 2013 0011126 A | 1/2013 |
| KR | 20140023719 A | 2/2014 |
| KR | 20140033735 A | 3/2014 |
| WO | WO2014015976 A1 | 1/2014 |

OTHER PUBLICATIONS

Tracking Control of a Welding Mobile Robot Based on Aaptive Backstepping Method, by Seong Jin Ma, et al.
Automatic Robot System (MARS).
K-Bug 3000, Digital Compact Heavy Duty Fillet Welder, Jul. 10, 2014.
Gecko-Filet Welding Carriage—http://www.promotech.eu/products, Jul. 10, 2014.

* cited by examiner

US 9,724,789 B2

MOBILE WELDING SYSTEM

CROSS REFERENCE TO RELATED APPLICATION AND INCORPORATION BY REFERENCE

This U.S. application claims the benefit of U.S. Provisional Patent Application No. 61/912,934 filed on Dec. 6, 2013.

TECHNICAL FIELD

The invention described herein pertains generally to a mobile welding system.

BACKGROUND OF THE INVENTION

Current automatic welding systems require the work piece to be moved relative to a stationary welder. Mobile welders used when it is not possible or practical to move the work piece relative to the welder use a welder mounted on a track attached to the welding surface. Such mobile welders have a drive system that is coupled to the track allowing the welder to travel along the track to perform a welding operation on the work piece. The track typically involves multiple sections that are laid out and joined together to define the path of the weld. In some instances, the track is mounted to the work piece, and in others, the track may be provided on an adjacent supporting surface. The use of a track is a physical limitation on the movement of the welding system, and adds significant cost in terms of the track used and labor required to layout the track. In addition, installation of the track may raise safety issues that add additional cost to the automatic welding system.

SUMMARY OF THE INVENTION

The present invention provides a mobile welding system that does not rely exclusively on a track to define the path of the welder. The present invention generally provides a mobile welder adapted to move along a work piece, the mobile welder including a chassis supporting a motor assembly; a travel assembly attached to the chassis and adapted to support the chassis over a portion of the work piece, wherein the motor is coupled to the travel assembly to selectively cause the chassis to move relative to the work piece; a controller connected to the motor assembly to control movement of the chassis relative to the work piece; a chassis holder connected to the chassis, the chassis holder being adapted to provide a force holding the chassis a selected distance from the work piece; and a welder supported on the chassis, the welder including an implement adapted to perform a welding operation, wherein the implement is supported on the chassis at a location where the implement and the chassis define an uninterrupted line of sight from the implement to the work piece, wherein the chassis holder is spaced from the line of sight a distance sufficient to prevent the chassis holder from interfering with the welding operation.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

Figure 1:
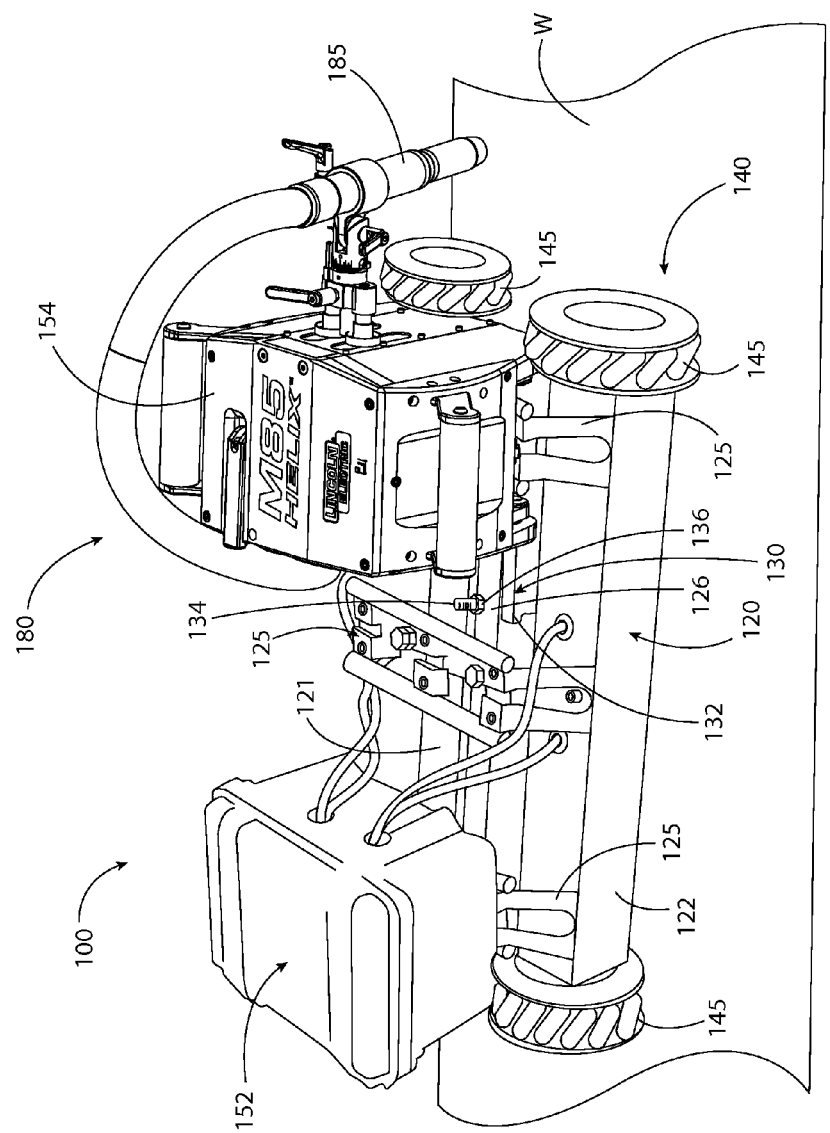
FIG. 1 is a perspective view of a mobile welder according to the invention.
Figure 2:
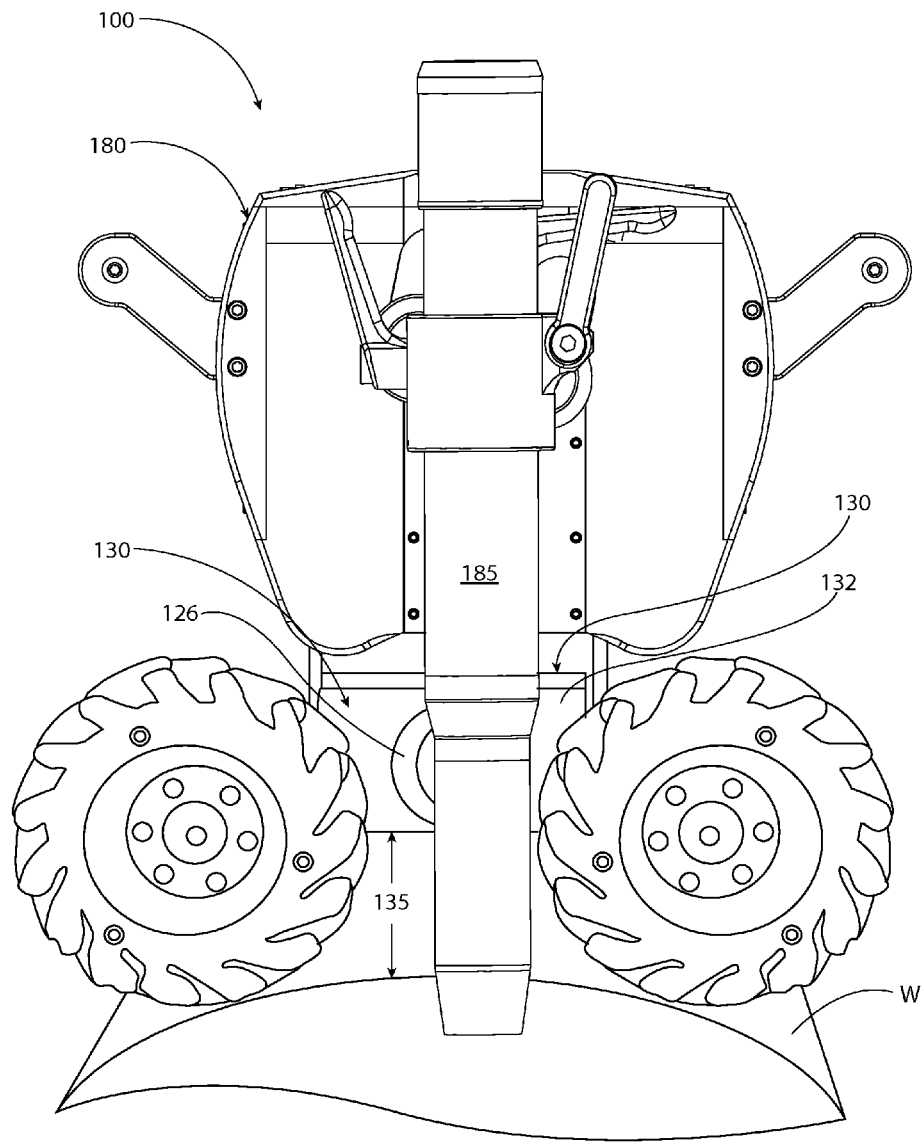
FIG. 2 is a side view thereof.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION OF THE INVENTION

A mobile welder according to the invention includes a base travel platform referred to as a chassis herein and a welder mounted on the platform. An exemplary chassis will be described herein with reference to the drawings. Other chassis configurations may be used and the examples shown are not limiting. The welder includes an implement adapted to perform a welding operation. A welding operation may include but is not limited to the welding, brazing, soldering, coating, hardfacing, and cutting. The implement may include a laser, a waterjet, flame or arc generating torch or other system used in performing a welding operation. The implement may be mounted directly to the chassis or contained within a separate component that is attached to the chassis. For example, implement may be mounted on a robot arm, a MIG weld system, a TIG weld system and the like.

One example of a mobile welder is depicted in the accompanying drawings and referred to by the number 100. Mobile welder 100 generally includes a base travel platform or chassis 120. Chassis 120 may have any shape or form suitable for supporting a welder 180 described more completely below. Chassis 120 may include one or more frame components. In the example shown, chassis 120 has a first rail 121 and a second rail 122 that are spaced from each other. In the example shown, rails 121,122 are constructed of tubular frame members. One or more couplings 125 may extend between and connect the first rail 121 to second rail 122. In the example shown, couplings 125 are rigid. In other embodiments, the coupling 125 between first rail 121 and second rail 122 may be hinged or otherwise moveable to allow relative movement between rails 121, 122.

Chassis 120 further includes a chassis holder, generally indicated by the number 130. Chassis holder 130 is adapted to develop a force to hold the chassis at a selected distance from the work piece W. For example, chassis holder may include any mechanism that pulls the chassis toward the work piece including but not limited to a passive magnet, such as a permanent magnet material, active magnet, such as an electro-magnet, a pump used to develop a differential force, such as an impeller or vacuum pump. In certain embodiments, chassis holder 130 develops a force to hold chassis 120 to the work piece and counteract forces tending to pull chassis 120 away from a work piece W, such as, for example, a buoyant force or gravitational force. In the example shown, a permanent magnet such as a neodymium magnet is used.

Figure 7:
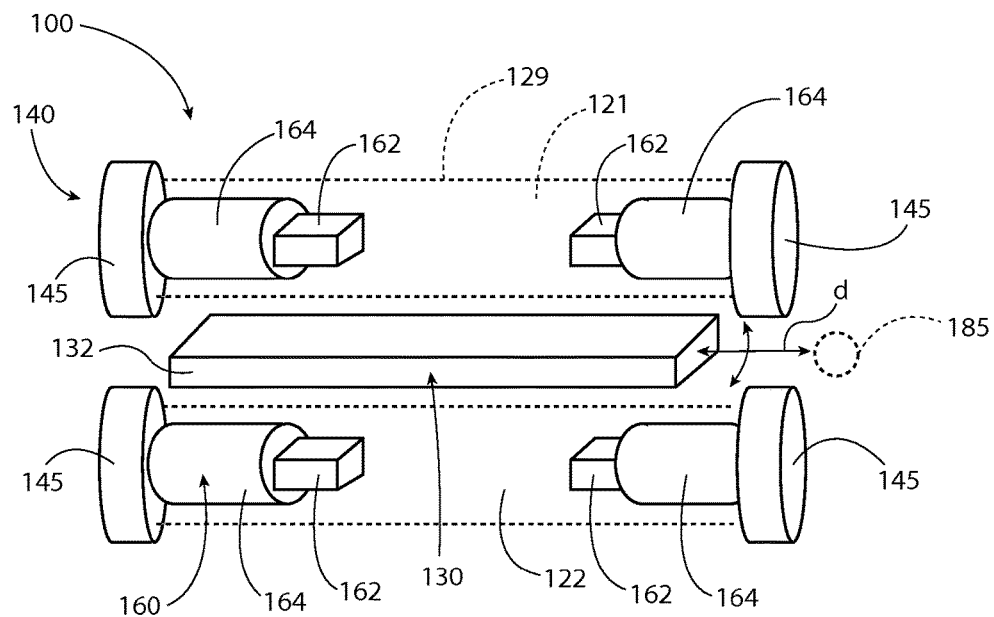
FIG. 7 is a schematic view of the mobile welder depicting further details of the motor assembly, travel assembly and chassis holder.

In using magnets to provide the holding force, one or more magnets 132 may be used. The orientation and configuration of the magnet 132 may adapted based on the shape and size of the chassis 120 and the mass or payload of the chassis and its attendant components. For example, magnets 132 may be carried on brackets or outriggers attached at the periphery of chassis 120 or a centrally mounted magnet 132 may be used as shown. As best seen in FIG. 1, chassis includes a central rail 126 in the form of a cylindrical tube that extends parallel to the first and second rails 121,122 and lies between these rails. A single elongated magnet 132 may be supported on rail 126. In the example shown, magnet 132 is attached to rail 126 by threaded fasteners 134 that extend through rail 126 and are secured by a top nut 136. The threaded fastener 134 and nut 136 form a magnet height adjustment assembly that allows adjustment of the clearance between the magnet 132 and work piece W. The ends of the cylindrical tube may be journalled to allow rotation of the tube to tilt magnet 132 as needed to orient the magnet relative to the work piece W (FIG. 7). Once oriented, the pivotal position of magnet 132 may be maintained by a suitable locking assembly including but not limited to a set screw, bracket, pin or clamp. Other orientation control structures and magnet configurations may be used. In this way, the orientation and configuration of magnets 132 may be adjusted to accommodate a given work surface or to provide a selected magnet clearance between the work piece W and magnet 132 to provide a desired holding force or to minimize the magnet's interference with the welding operation. The magnet clearance 135, which may also be referred to as a gap, may be set to provide full saturation of the magnetic force in the surface while providing some space between the magnet 132 and work piece W to avoid frictional contact between the surface of the magnet 132 and work piece W. It has been found that providing a gap 135 that provides full saturation of the magnetic force generated by magnet 132 in work piece W minimizes the intereference of the magnet 132 with the welding process. It will be understood that magnetic fields can have a deleterious effect on the welding operation by interfering with the generation and maintenance of an arc or the deposition of molten metal material used in the welding operation.

Chassis 120 comprises a travel assembly 140 that supports the chassis 120 over work piece W and facilitates movement of chassis 120 relative to work piece W. Travel assembly 140 may include any type of propulsion system 143 including but not limited to active wheels, track assemblies, propellers, or actuators. The propulsion system 143 moves the chassis 120. Similar passive travel elements may be provided simply to maintain the chassis 120 at a selected distance from the work piece W. For example, wheels, runners, rollers and the like may support the chassis 120 above work piece W. Alternatively, propellers or other floats, or other buoyancy elements may be used to cause the chassis 120 to hover or float at a set distance above work piece. In the example shown, travel assembly 140 includes omni-directional wheels that perform dual functions of supporting the chassis 120 at a selected distance above the work piece and move the chassis 120. Omni direction wheels may be a Mecanum wheel 145, as shown. Mecanum wheel may be any type of Mecanum wheel including the construction shown in U.S. published application 2013/0292918, which is incorporated by reference. In the example shown, each wheel includes a series of rollers attached to the wheel's circumference and configured to have an axis of rotation offset about 45 degrees from a vertical plane of the wheel 145.

Chassis 120 may further include a motor assembly 160 (FIG. 7) coupled to the travel assembly to selectively cause the chassis 120 to move relative to the work piece W. In the example shown, motor assembly includes a motor corresponding to each wheel to drive each wheel independently. In particular, four wheels are mounted on the chassis with each wheel being coupled to a motor 162 by a gear box 164. In the examples shown, first rail 121 and second rail 122 each house a pair of motors and their respective gear boxes within the tubular frame members forming rails 121,122. Wheels 145 are supported at the end of each rail and have a diameter greater than the rail to support the lower surface of the chassis a distance above the work piece W.

Figure 6:
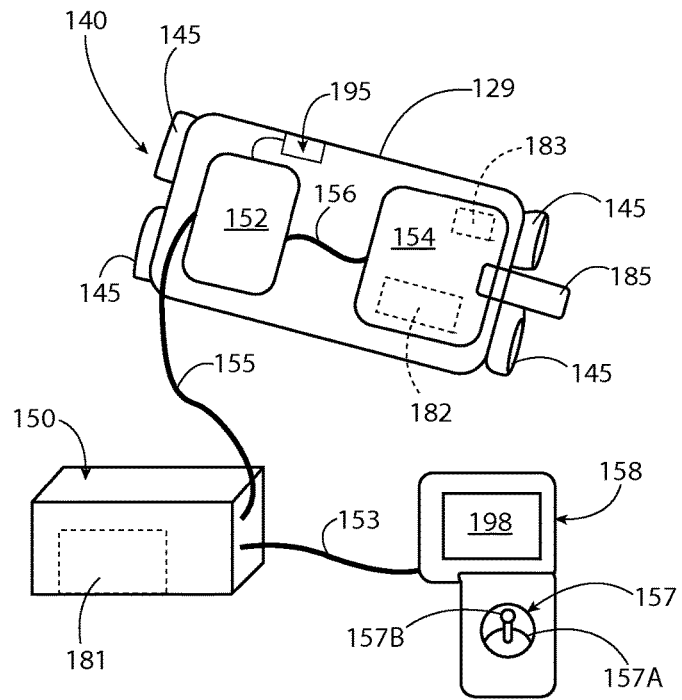
FIG. 6 is a schematic view of a mobile welder depicting details of the control and power connections for the mobile welder.

With reference to FIG. 6, controller 150 may include a motor controller 152 electrically connected to motor assembly 160 to control motion of chassis 120 relative to work piece W. Motor controller 152 may, as in the example shown, independently control motion of each wheel through the individual motors 162. In the example shown, individual control of the motors 162 at each wheel 145 may be used to cause all of the wheels to rotate in the same direction and same speed to cause uniform movement along a path parallel to the axis of the wheels; with one diagonally opposed pair of wheels rotating in one direction and a second pair of diagonally opposed wheels rotating in a second direction opposite the first direction to cause movement perpendicular to the axis of the wheels, or rotation of a first pair of aligned wheels in a first direction and rotation of a second pair of aligned wheels in a second direction to cause rotation of the chassis. Variations of the speeds of each wheels and combinations of the above may be used to cause the chassis to move sideways, diagonally, straight forward, straight backward, or along curved paths.

Controller 150 may also include a welding controller 154 that controls operation of the welder 180, as described more completely below. Motor controller and welding controller may be connected to each other to synchronize the welding operation and movement of the chassis or consolidated in a single controller. Welder controller 154 may be located on chassis 120 or an external controller 154 may be used. In the example shown, an umbilical 155 connects welder controller 154 to motion controller 152. A control cable 156 connects motion controller 152 to welder 180. The umbilical and control cable provide control signals to the motor assembly 160 and welder 180. In addition, these connections may also supply power to the motor assembly 160 for operation of the motors 162 and power to welder 180 for performing a welding operation. In accordance with another aspect of the invention, a remote controller 158, such as a pendant or other device may be connected through a wired or wireless connection to controller 150 to allow remote operation of mobile welder 100.

In the depicted example, remote controller 158 is connected to controller 150 by a cable 153. Remote controller 158 is configured to provide motion control of mobile welder 100 as well as control of the welding operation, as described more completely below in connection with welder 180. Remote controller 154 may have any configuration and any number or variety of interfaces and displays to facilitate communication between the welder 180 and a user. For example, remote controller may include a pendant as described in provisional application 61/903,155, which is incorporated by reference.

In the example shown, remote controller includes a motion interface, generally indicated at 157 that facilitates manual control of the movement of the chassis 120. Motion interface may be any interface suitable for translating user inputs into signals for the motion controller 152 to control movement of the chassis 120 including but not limited to a joystick, a touch pad, a key pad, keyboard, sliders, track ball, or a motion tracking device adapted to monitor the user's body movements. In the example shown, a joystick is provided. Tilting of the joystick forward, rearward, left, right and any positions therebetween result in the transmission of a signal from the joystick to the motion controller 152, which in turn, signals the motors 162 to move the chassis 120 according to the position of the joystick. Motion interface 157 may include a second interface to provide an additional signal to motion controller 152, such as speed or selection of a pre-defined pattern of movement. The second interface may be the same type of interface as the first interface or a different interface may be used. In the example shown, first interface 157A is a joystick and second interface 157B is a rotatable knob mounted on joystick. Rotatable knob may be used in connection with motion controller 152 to provide additional input for controlling the motion of chassis 120. For example, knob may be used to control the rate of chassis movement while the joystick is used to control the direction of chassis movement. Alternatively, as shown, second interface 157B may control one or more aspects of the welder 180. For example, welder 180 may include an implement 185 that is moved independently of the chassis 120. For example, implement 185 may include a drive that moves the implement inward and outward relative to the chassis along a plane extending perpendicular to the body of the welder 180. This movement may include an oscillation pattern of inward and outward movement that is repeated by the implement 185. The drive and implement 185 may be capable of much more precise movement and control compared to movement of the chassis 120. Second interface 157B may be used in connection with welder controller 154 to control this movement. For example a slope or other irregularity on the surface may cause the chassis 120 to move a slight amount from the intended path of the welder 180. Gross movement of the chassis may be impractical for adjusting to this movement. With the greater level of control through the implement 185 and its drive, second interface 157B may be used to steer the implement 185 and adjust for the slight movement of the chassis 120. When implement is performing an oscillation, second interface 157B may steer the center point of the oscillation. Alternatively, second interface 157B may be used to reset one or both of the outer limits of the oscillation to change the oscillation pattern or adjust one or both of the outer limits if the oscillation pattern has become irregular. According to another aspect of the invention, a vertical movement of joystick may be used to reset the position of the implement 185, such as for example, returning an oscillating implement 185 to the center position. It will be appreciated that other positions including, for example, a home position or other position where the implement is disengaged or positioned to facilitate repair may be activated in a similar manner. Use of the first and second interface 157A,B for controlling motion of the implement 185 through the chassis 120 or directly through the welder 180 should not be considered limiting. Additional interfaces may be provided to provide greater functionality or control of the chassis 120 and/or welder 180.

Figure 3:
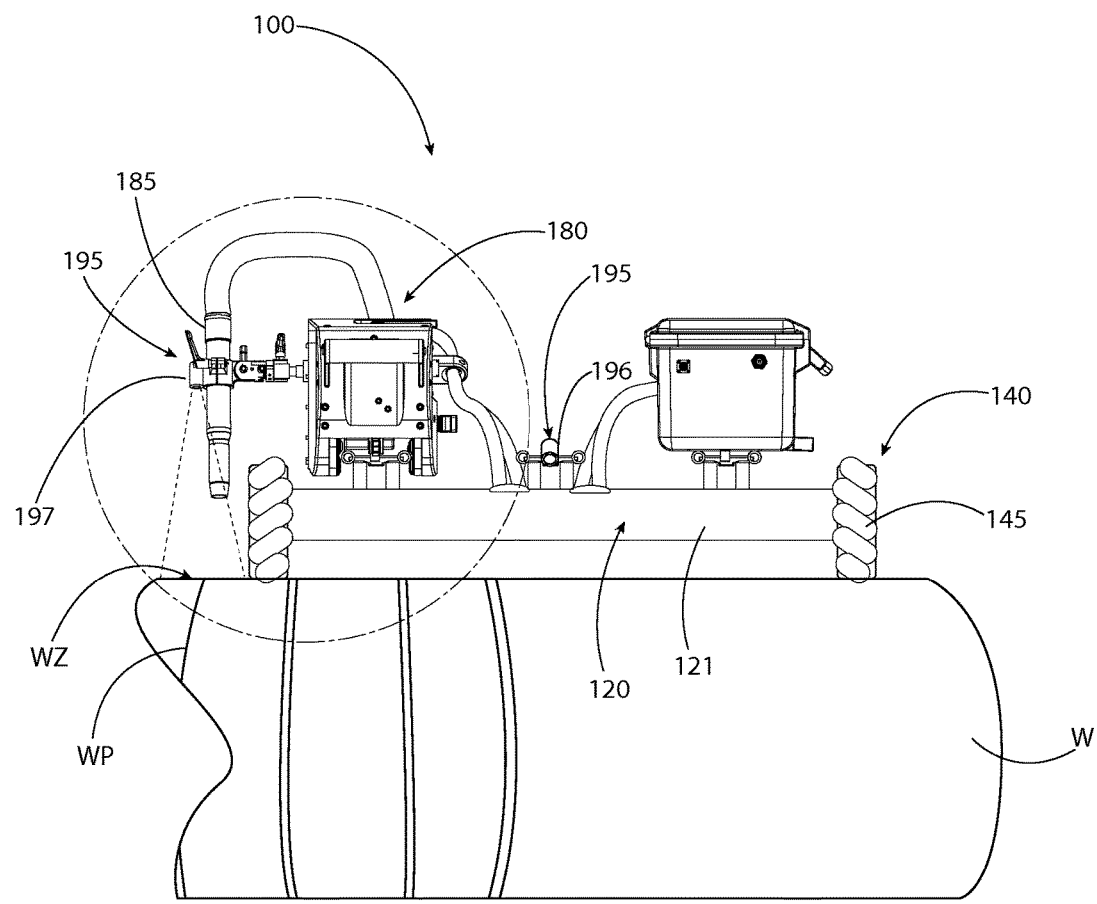
FIG. 3 is a front view thereof.

As referenced above, a welder 180 is supported on the chassis 120. The welder 180 includes an implement 185 capable of performing a welding operation. As best shown in FIGS. 1 and 3, implement 185 is supported on chassis 120 such that it has an uninterrupted line of sight to the work piece. In the example shown in FIG. 6, welder 180 is a MIG welder and includes a power supply 181 that provides power to implement 185 for generating an arc. Welder 180 further includes a wire supply 182 that provides wire to the implement 185. Wire feeder 182 may draw wire from an external supply or a wire supply may be provided as part of the welder 180. In the example shown, the wire supply 182, in the form of a spool of wire, is provided on the welder 180. In addition, welder 180 may include an inert gas supply 183 that provides shielding gas to the implement 185. Optionally, if submerged arc welding is performed, welder 180 may include a flux supply. Other optional components commonly used in other welding operations may be provided as part of the welder, as well.

Figure 8:
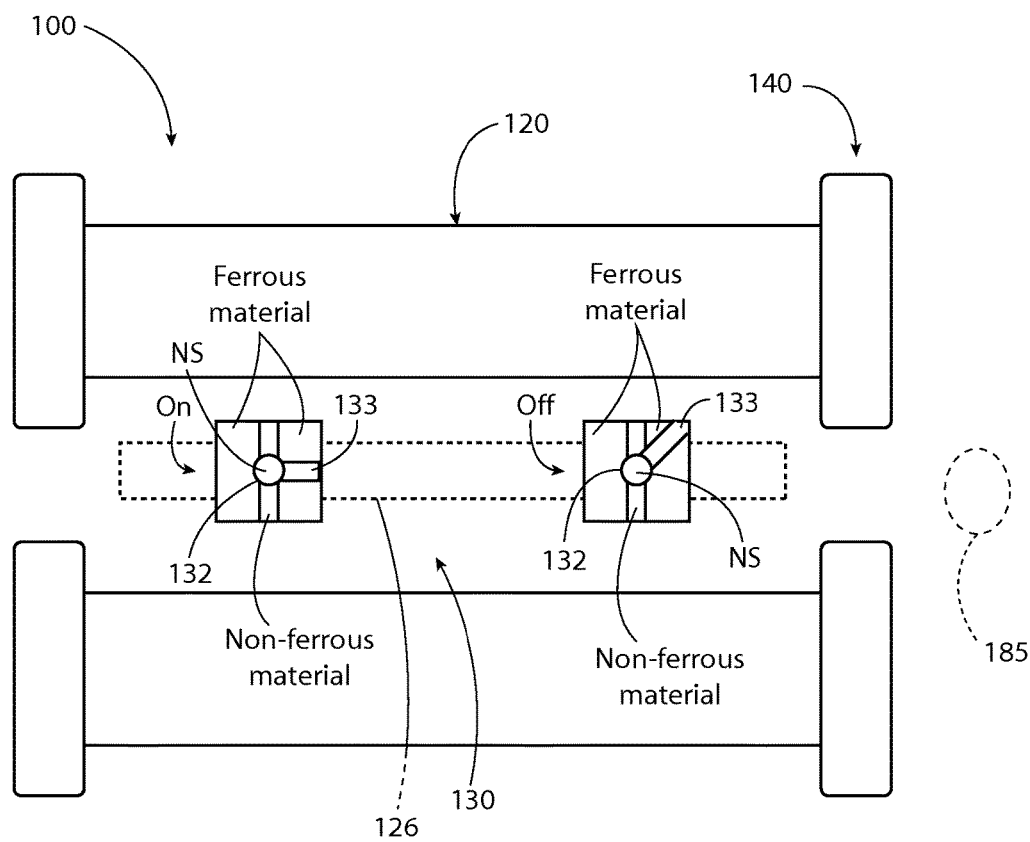
FIG. 8 is a schematic view showing an alternative chassis holder that includes a magnet that may be moved between an on position where the magnet directs a magnetic force toward the work piece and an off position where no magnetic force is generated.

As best seen in FIG. 3, welder 180 may be supported at an end of chassis 120 and implement 185 may extend outward of the periphery 129 of chassis 120 to provide a direct and uninterrupted line of sight between implement 185 and work piece W. Alternatively, an opening or notch may be defined by chassis 120 to provide the line of sight. This allows implement to direct an arc, waterjet, molten material, or laser at the work piece in accordance with the particular welding operation being performed. In the example shown in FIG. 7, extending the implement 185 outward of the chassis 120 also spaces implement 185 outward from magnet 132, which is housed within the periphery of chassis 120 in this example, by a distance d to minimize any interference from the magnetic field of magnet 132 with implement 185 including but not limited to distortion of the arc or droplets of molten material. To further minimize interference from the magnet, as discussed above, the gap 135 between magnet 132 and work piece W may be adjusted to ensure full saturation of the magnetic field within the work piece W. It will be appreciated that in some instances, the magnetic field will not be needed to hold the chassis relative to the work piece. For example, when the chassis is on a surface where gravity or another force will hold the chassis on the work piece, the magnetic force will not be needed. According to another aspect of the invention, the magnetic force of chassis holder 130 may be selectively withdrawn when not needed to avoid under saturation of the magnetic force, which could interfere with the welding operation. For example, as shown in FIG. 8, magnet 132 may be rotatable within a bracket that places its north and south poles in contact with a non-ferrous material to prevent generation of a magnetic force (off) and in contact with a ferrous material to generate a magnetic force (on). Rotation of the magnet 132 may be done manually or automatically. In the example shown, an actuator 133 is provided to selectively rotate the magnet between an on position where a magnet force is generated and an off position where no magnet force is generated. The actuator may be controlled by controller 150. For example when a reduced amount of magnetic force is needed, a magnet 132 near implement 185 may be placed in the off condition with a magnet 132' farther from the implement 185 left on.

Welder 180 may be supported on chassis 120 in any manner including directly attaching the welder 180 to the chassis 120 or providing for removable attachment of welder 180 as shown. In the example shown, welder 180 includes a welder that may be mounted to a track and includes a track clamping assembly. In accordance with an aspect of the invention, a section of track 190 is provided on chassis 120 to provide a mounting location for a track mounted welder such as the one shown. Multiple sections of track 190 may be attached to chassis to provide multiple mounting locations for a single welder or to attach multiple welders to the chassis. For example, in addition to the embodiment shown, which shows a first length of track 190 at an outer edge of chassis and a second length located inward of the first length, a chassis having a length of track 190 at each outer edge may be used to attach welders at opposite ends of the chassis. These welders may then be operated simultaneously to perform welding operations at each end of the chassis. These examples are not limiting as additional mounts may be provided to increase the number of locations to which one or multiple welders may be attached.

Figure 9:
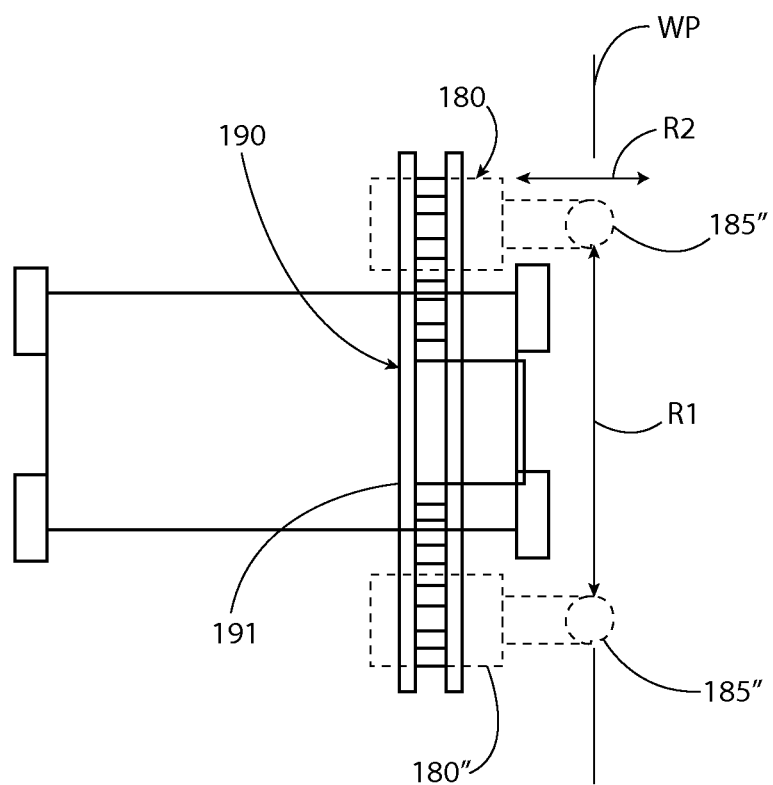
FIG. 9 is a schematic top view of a mobile welder having a welder mounted on a track section and movable along the track section.

In accordance with another aspect of the invention, the welder may travel on a section of track 190. For example, a section of track 190 having a length would allow the track mounted welder to travel along the length of track 190 to provide further flexibility in the welding operation. The track length may exceed the perimeter of the chassis to allow the welding operation to extend beyond the chassis while the chassis is stationary or provide additional freedom of movement while the chassis is in motion. In one example, a four foot length of track 191 (FIG. 9) may be mounted at one end of chassis 120. The four foot length 191 would be centered on the chassis and extend parallel to the direction of the wheels with each end cantilevered from the chassis 120. It will be appreciated that the length of track 190 can be any length with proper sizing of the foot print of the chassis 120 and travel assembly 140. The example shown, therefore, should not be considered limiting. The tractor drive T within the track mounted welder 180 could be used to index welder 180 to different locations along the track 190 to perform welding operations at the indexed locations. In addition to the solid line position, where the welder 180 is centered on a track 190, FIG. 9 shows the welder in dashed line position 180' at the forward extremity of a track 190 and in a rearward extremity of track 190 in dashed line position 180". The extremity positions 180' and 180" define a range of motion R1 along the weld path WP for the welder 180 movable on the track 190. In the given example, the implement 185 includes an implement drive that moves the implement 185 in a plane that extends perpendicular to welder 180 and weld path WP. The range of motion along this plane is depicted schematically at R2. It will be appreciated that without any movement of chassis 120, the welder 180 so mounted may perform a welding operation anywhere within the area defined by R1 and R2.

Figure 4:
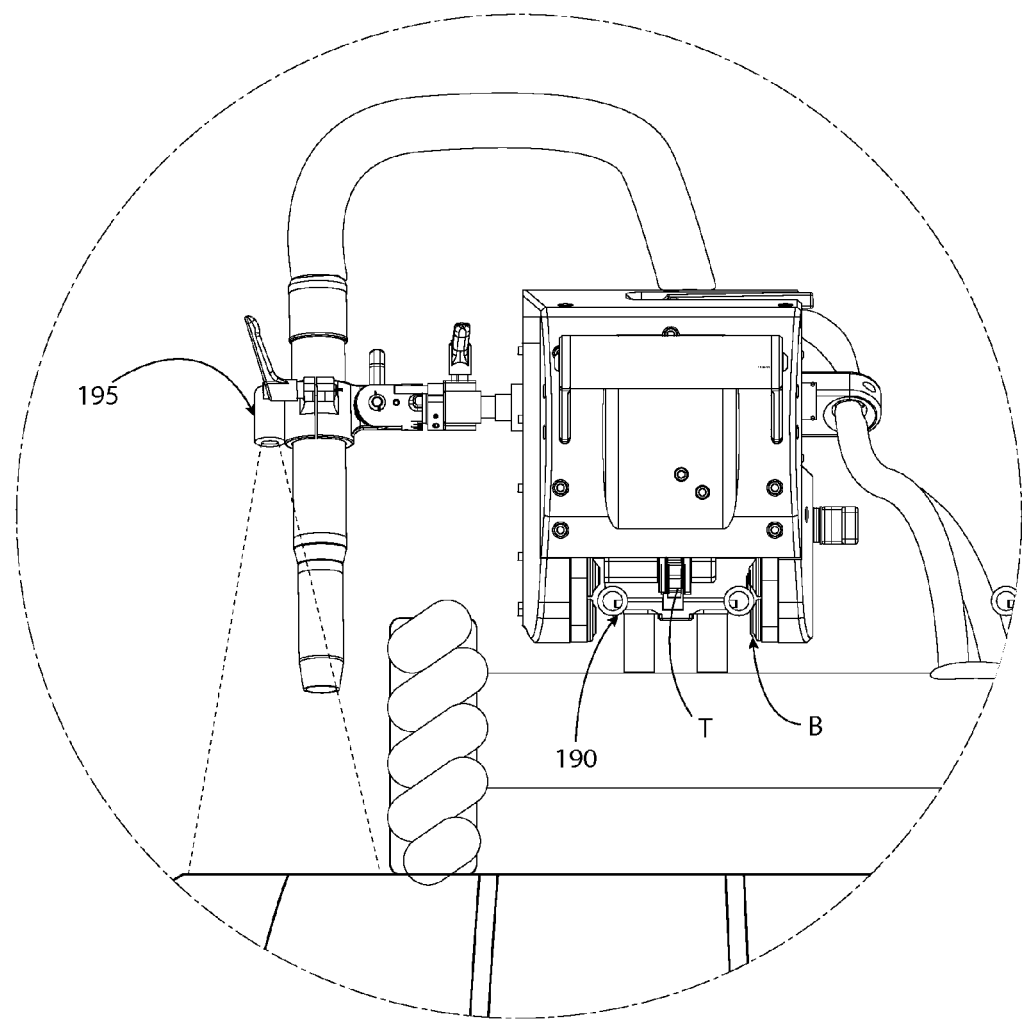
FIG. 4 is an enlarged view similar to FIG. 3 showing further details of a welder mounting assembly.
Figure 5:
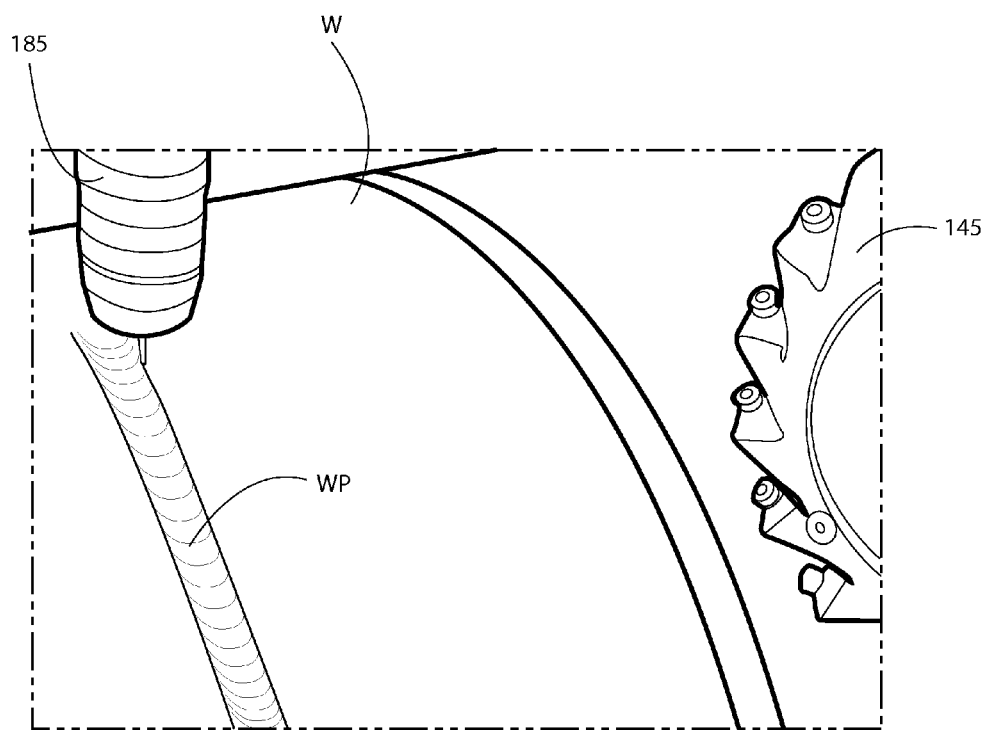
FIG. 5 is an enlarged view of a welding operation being performed by the mobile welder.

In accordance with another aspect of the invention, connection of the welder 180 to the chassis 120 may generate a signal to controller 150 so that the controller knows that the welder 180 is mounted on the chassis 120. This signal may be generated by an electrical connection established as part of the physical connection of the welder 180 to the chassis 120, or when the control tether, which is in communication with controller 150 is connected to welder 180 as shown. This signal to controller may likewise be transmitted to a welder controller 154 or remote controller 158 provided. In the example shown, the MIG welder 180 includes an on-board welder controller 154, which among other functions, may be used to control operation of the track locking assembly (brake) B and clutch for the track drive T (FIG. 4). According to another aspect of the invention, upon receiving a signal that welder 180 is attached to a movable chassis 120, welder controller 154 may be preprogrammed to disable travel through the clutch for the track drive T while keeping the track locking brake B on to fix the welder 180 to track 190. This may be established as a default position upon attaching welder 180 to chassis 120. The default position may be altered by the user to allow movement along the track 190 with welder 180 attached to chassis 120 as described above.

According to another aspect of the invention, the signal indicating connection of a welder 180 to chassis 120 may also include an implement identifier that is communicated to controller 150 such that controller 150 knows the type of implement 185 being used and can load control commands tailored to the particular implement. For example, the identifier may indicate that a MIG welder has been attached to the chassis such that wire feed and arc generation commands appropriate for the MIG welder are automatically loaded upon connection. Likewise, user interfaces on controller 150 and/or remote controller 158 may be automatically customized based on the implement being used.

In accordance with another aspect of the invention, a camera assembly 195 may be provided to monitor movement of the mobile welder 100. Camera assembly 195 may include one or more cameras mounted at various locations on mobile welder 100. As best shown in FIG. 3, camera assembly 195 may include a first camera 196 mounted on chassis 120. Camera 196 may be mounted to provide information about the environment that the mobile welder 100 is in or to provide feedback to the user regarding movement of the mobile welder 100. Camera assembly 195 also includes a second camera 197 to monitor the quality and position of the weld or to observe the work piece along the intended weld path WP. In the example shown, second camera is positioned to have a line of sight to a weld zone WZ to monitor the quality of the welding operation. First camera 196 is mounted on a forward portion of the chassis 120 to monitor motion of the mobile welder 100. Additional cameras may be mounted to the rear and the sides of the chassis to further monitor movement of the mobile welder 100. Cameras 196,197 may store video in memory or transmit the video via a wired or wireless connection to controller 150. In accordance with another aspect of the invention, video from camera assembly 195 may be transmitted to a display 198. For example, display 198 may be provided on remote controller 158 (FIG. 6).

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A mobile welder adapted to move along a work piece, the mobile welder comprising:
    a chassis;
    a travel assembly attached to the chassis and adapted to support the chassis over a portion of the work piece;
    a motor assembly supported on the chassis and coupled to the travel assembly to selectively cause the chassis to move relative to the work piece;
    a controller connected to the motor assembly to control movement of the chassis relative to the work piece;
    a chassis holder connected to the chassis, the chassis holder being adapted to provide a force holding the chassis a selected distance from the work piece, wherein the chassis holder comprises at least one magnet assembly, and wherein the at least one magnet assembly includes a magnet rotatatably mounted between a ferrous material and a non-ferrous material to selectively control application of a magnetic field toward the workpiece; and
    a welder supported on the chassis, the welder including an implement adapted to perform a welding operation.

2. The mobile welder of claim 1, wherein an orientation of the magnet assembly is adjustable to accommodate the workpiece to provide a desired holding force and minimize magnetic interference with the operation of the mobile welder.

3. The mobile welder of claim 2, wherein the at least one magnet assembly is spaced from the workpiece by a gap, wherein the at least one magnet assembly is movable to adjust the gap to produce full saturation of a magnetic field generated by the at least one magnet assembly within the workpiece.

4. The mobile welder of claim 1, wherein the motor assembly includes four motors supported on the chassis, and the travel assembly includes four Mecanum wheels, wherein each of the wheels is coupled to one of the four motors.

5. The mobile welder of claim 1, wherein the welding operation is selected from the group consisting of welding, brazing, soldering, coating, hardfacing, and cutting.

6. The mobile welder of claim 1, wherein the implement is selected from the group consisting of an arc welding torch, a MIG torch, a TIG torch, a flame torch, a laser, a waterjet, and a plasma cutter.

7. The mobile welder of claim 1, wherein the controller is in communication with a motion controller and a welder controller housed within the welder to simultaneously control motion of the chassis and operation of the implement.

8. The mobile welder of claim 7, wherein the welder controller is connected to an implement drive that moves the implement within a plane extending outward from the welder, wherein control of operation of the implement by the controller includes controlling the implement drive to position the implement independently of the chassis.

9. The mobile welder of claim 8, wherein the controller includes a remote controller having a first interface adapted to control motion of the chassis and a second interface adapted to control motion of the implement.

10. The mobile welder of claim 9, wherein the first interface is a joystick, and wherein the second interface is a knob mounted on the joystick and rotatable about an axis of the joystick.

11. The mobile welder of claim 10, wherein the implement is movable in the plane between an inner limit and an outer limit and, wherein a center point is defined between the inner and outer limit; and wherein rotation of the knob in a clockwise direction moves the center point outward and counterclockwise rotation of the knob moves the center point inward, and wherein the inner and outer limit move with the center point by operation of the knob.

12. The mobile welder of claim 1, wherein the welder is removably attached to the chassis.

13. The mobile welder of claim 12, wherein the chassis includes a section of track supported thereon and the welder includes a track locking assembly that removably attaches the welder to the section of track.

14. The mobile welder of claim 1 further comprising a wire feeder and wire supply supported on the chassis, the wire feeder being operatively connected to feed wire from the wire supply to the implement.

15. The mobile welder of claim 1, wherein the at least one magnet assembly is connected to a rotatable mechanism that allows for selective tilting of the magnet assembly relative to the workpiece.

16. A mobile welder adapted to move along a work piece, the mobile welder comprising:
    a chassis;
    a travel assembly attached to the chassis and adapted to support the chassis over a portion of the work piece;
    a motor assembly supported on the chassis and coupled to the travel assembly to selectively cause the chassis to move relative to the work piece;
    a controller connected to the motor assembly to control movement of the chassis relative to the work piece;
    a chassis holder connected to the chassis, the chassis holder being adapted to provide a force holding the chassis a selected distance from the work piece, the chassis holder including at least one magnet supported on the chassis and adjustable to define a gap between the magnet and the workpiece; and a welder supported on the chassis, the welder including an implement adapted to perform a welding operation, wherein the gap is adjustable to obtain a desired holding force and minimize interference of a magnetic field from the magnet with the welding operation;

wherein the controller includes a remote controller having a first interface adapted to control motion of the chassis and a second interface adapted to control motion of the implement, wherein the first interface is a joystick, and wherein the second interface is a knob mounted on the joystick and rotatable about an axis of the joystick.

17. The mobile welder of claim 16, wherein the controller includes a welder controller adapted to control operation of the welder.

18. The mobile welder of claim 17, wherein the controller is located remotely of the chassis and connected by a wired connection to provide power and control signals to the welder and the motor assembly.

19. The mobile welder of claim 16 wherein the controller includes a pendant that is located remotely of the chassis, the pendant including a welder controller, wherein the pendant is connected to the motor assembly and the welder by at least one of a wired connection and a wireless connection to provide control signals to the motor assembly and the welder.

20. The mobile welder of claim 16, wherein the travel assembly includes four Mecanum wheels, wherein the motor assembly is adapted to selectively drive each of the four Mecanum wheels to move the chassis in at least one of a forward, backward, left, right, diagonal or curved path.

* * * * *